(12) United States Patent
Adams, IV et al.

(10) Patent No.: US 9,675,176 B2
(45) Date of Patent: Jun. 13, 2017

(54) LIGHTWEIGHT ADIRONDACK CHAIR

(71) Applicants: William E. Adams, IV, Zelienople, PA (US); Matthew Goodworth, Pittsburgh, PA (US)

(72) Inventors: William E. Adams, IV, Zelienople, PA (US); Matthew Goodworth, Pittsburgh, PA (US)

(73) Assignee: Adams Mfg. Corp., Portersville, PA (US)

( * ) Notice: Subject to any disclaimer, the term of this patent is extended or adjusted under 35 U.S.C. 154(b) by 21 days.

(21) Appl. No.: 14/791,780

(22) Filed: Jul. 6, 2015

(65) Prior Publication Data

US 2016/0007755 A1    Jan. 14, 2016

Related U.S. Application Data

(60) Provisional application No. 62/023,405, filed on Jul. 11, 2014.

(51) Int. Cl.
| | |
|---|---|
| *A47C 5/12* | (2006.01) |
| *B29C 45/16* | (2006.01) |
| *B29C 45/27* | (2006.01) |
| *B29L 31/44* | (2006.01) |
| *B29K 105/26* | (2006.01) |
| *B29C 45/00* | (2006.01) |

(52) U.S. Cl.
CPC ............... *A47C 5/12* (2013.01); *B29C 45/16* (2013.01); *B29C 45/0046* (2013.01); *B29C 45/2708* (2013.01); *B29K 2105/26* (2013.01); *B29L 2031/443* (2013.01)

(58) Field of Classification Search
CPC ........................................................ A47C 5/12
USPC ........................................................ 297/239
See application file for complete search history.

(56) References Cited

U.S. PATENT DOCUMENTS

| | | | | |
|---|---|---|---|---|
| 4,341,419 A | * | 7/1982 | Sebel | A47C 1/124 |
| | | | | 297/239 |
| 5,044,691 A | * | 9/1991 | Guichon | A47C 3/04 |
| | | | | 297/239 |
| 5,088,792 A | * | 2/1992 | Guichon | A47C 3/04 |
| | | | | 297/239 |
| D329,339 S | * | 9/1992 | Grosfillex | D6/370 |
| D334,299 S | * | 3/1993 | Embree | D6/370 |
| D341,953 S | * | 12/1993 | Bemis | D6/370 |
| D354,179 S | * | 1/1995 | Greene | D6/369 |
| D384,511 S | * | 10/1997 | Gresens | D6/366 |

(Continued)

*Primary Examiner* — Timothy J Brindley
(74) *Attorney, Agent, or Firm* — Buchanan Ingersoll & Rooney PC

(57) ABSTRACT

A lightweight molded plastic Adirondack chair has front legs which each have an inner side wall that slopes inward. A pair of side walls each extends from and along a front leg, along the side edge of the seat and along a rear leg. The side walls vary in height along their length and are tallest adjacent a transition from the side edge of the seat to the rear leg. A front slat extends from the front edge of the seat and between the front legs forming an arch with the front legs. An arm support extends from each front leg to the front of the arm above that leg. The arm supports extend forward relative to the seat. These structural features improve the strength of the chair such that most portions of the chair can be thinner resulting is a chair that weighs less than 6 pounds.

12 Claims, 11 Drawing Sheets

(56) References Cited

U.S. PATENT DOCUMENTS

| | | | | |
|---|---|---|---|---|
| 5,860,697 | A | * | 1/1999 | Fewchuk .................. A47C 3/04 |
| | | | | 297/188.04 |
| D413,452 | S | * | 9/1999 | Rhienen ......................... D6/370 |
| D416,397 | S | * | 11/1999 | Niemiec ......................... D6/370 |
| D419,790 | S | * | 2/2000 | Rhienen ......................... D6/369 |
| D430,748 | S | * | 9/2000 | Chalmers ....................... D6/370 |
| D431,726 | S | * | 10/2000 | Anderson ....................... D6/370 |
| D435,739 | S | * | 1/2001 | Hand ............................ D6/370 |
| D443,430 | S | * | 6/2001 | Anderson ....................... D6/370 |
| 7,401,854 | B2 | | 7/2008 | Adams |
| D607,223 | S | * | 1/2010 | Adams ........................... D6/370 |
| D646,075 | S | * | 10/2011 | Bogdan ......................... D6/375 |
| D660,040 | S | * | 5/2012 | Bogdan ......................... D6/370 |
| 8,172,317 | B2 | * | 5/2012 | Gamboa .................. A47C 3/04 |
| | | | | 297/188.14 |
| 8,333,430 | B2 | | 12/2012 | Adams et al. |
| D677,069 | S | * | 3/2013 | Adams, IV ..................... D6/370 |
| D717,058 | S | * | 11/2014 | Prokofiev ...................... D6/370 |
| D733,449 | S | * | 7/2015 | Adams, IV ..................... D6/370 |
| D761,030 | S | * | 7/2016 | Proserpio ....................... D6/348 |
| 2006/0163920 | A1 | * | 7/2006 | Adams ................ A47C 1/0265 |
| | | | | 297/239 |
| 2010/0066139 | A1 | * | 3/2010 | Woodring .............. A47C 3/029 |
| | | | | 297/239 |
| 2010/0301644 | A1 | * | 12/2010 | Adams .................. A47C 7/462 |
| | | | | 297/183.1 |
| 2015/0223609 | A1 | * | 8/2015 | Prokofiev ................ A47C 7/68 |
| | | | | 297/188.14 |

* cited by examiner

LIGHTWEIGHT ADIRONDACK CHAIR

FIELD OF INVENTION

The present invention relates to Adirondack chairs.

BACKGROUND OF THE INVENTION

Adirondack chairs are a larger type of chair and are very popular. For many years, these chairs were made of wood with the pieces of the chair nailed, glued, bolted, or screwed together to form a single unit. The chair has a straight back that is formed by multiple wooden planks that extend from a seat at an angle. Most wooden Adirondack chairs are not foldable. They are heavy and also very difficult to stack. More recently, some Adirondack chairs have been made of plastic. These chairs are molded to look like the old wooden Adirondack chairs.

U.S. Pat. No. 7,401,854 to Adams discloses foldable Adirondack chairs. The chairs may be stacked on top of each other by folding the rear legs to a position substantially parallel to the seat and subsequently positioning nesting the chair within a second chair. Unfortunately, this method of stacking Adirondack chairs can provide a stack of chairs that is not straight. Often, the stack of Adirondack chairs disclosed in U.S. Pat. No. 7,401,854 has a forward lean, which can cause the stack of chairs to fall down.

U.S. Pat. No. 8,333,430 B2 to Adams et al. discloses a molded plastic Adirondack chair having a lumbar support. This Adirondack chair is stackable as shown in FIG. 9 of the patent. These Adirondack chairs are stacked on pallets for shipment to a retailer. The retailer may display the chairs on their shipping pallets. A 52 foot long trailer can carry 1368 of these Adirondack chairs stacked on pallets. Adams Mfg. Corp. has made a commercial version of this Adirondack chair from a blend of polypropylene and polypropylene containing a small amount of polyethylene to provide impact resistance that weighs around 7 pounds. An Adirondack chair made with a variation on this formulation that contains about 8% calcium filler weighs around 7.5 pounds. Other molded plastic Adirondack chairs in the marketplace weight 10.23 and 11.27 pounds. There is a need for a lighter weight Adirondack chair that would allow more chairs to be stacked per pallet and more chairs carried per trailer. The cost to make such a lightweight chair could be significantly less than the cost to make the molded plastic Adirondack chairs that are now available in the marketplace.

Plastic chairs for outdoor use must meet certain standard performance requirements or retailers will not purchase them. ASTM F 1561-03 standard sets forth specific tests to be performed in order to determine if a plastic chair meets those requirements. One test involves placing the chair on a glass surface which simulates smooth surfaces such as linoleum and wet pool decks. Three hundred pounds is placed on the chair. The chair must then hold for at least 30 minutes without failing. Failure occurs when the chair collapses or when any visible evidence of structural damage develops such as cracking. Another test from the ANSI/BIFMA X5.1 standard involves dropping a 225 pound canvas bag containing lead shot in tightly packed compartments on the chair. The bag is dropped from a height of 6 inches at a location on the seat which is not more than ½ inch from the back. The chair is then checked for cracks.

Prior to the present invention the art has not created an Adirondack chair weighing less than 7 pounds that will meet both of these performance requirements.

SUMMARY OF THE INVENTION

We provide a lightweight molded plastic Adirondack chair which has a seat having a front edge, a back edge, the back edge being narrower than the front edge, a first side edge and a second side edge. A back is attached to the seat. The back preferably has ribs on the rear surface of the back. A left front leg and a right front leg are each attached to the seat adjacent to the front edge of the seat, The front legs each have an inner side wall that slopes inward from a front edge of the side wall to a back edge of the side wall. A left back leg and a right back leg are attached to the seat adjacent the rear edge of the seat. A pair of side walls each extends from and along at least a portion of a front leg, along the side edge of the seat and along at least a portion of a rear leg. The side walls vary in height along their length and are tallest adjacent a transition from the side edge of the seat to the rear leg. A left arm and a right arm extend from the back toward the front edge of the seat. An arm support is provided for each arm. One end of the arm support is attached to the arm and an opposite end is attached to a front leg. The arm supports extend forward relative to the seat.

We prefer to provide a front slat that extends from the front edge of the seat and between the front legs forming an arch with the front legs. The front slat has a lower edge portion that slopes inwardly.

We also prefer to provide a first rib on the underside of the seat and having a first height and a second rib adjacent the first rib. The second rib has a height that is less than the first height and has a notch near its center. Additional ribs may be provided on the underside of the seat.

These features enable most portions of the chair to have a thickness of 0.150 inches (0.381 cm.) while having sufficient strength to pass the tests described above. Consequently, an Adirondack chair weighing less than six pounds can be produced.

This Adirondack chair is made in an injection molding machine. We prefer to use a mold having two gates. One gate is positioned to inject plastic into a rib on the bottom surface of the seat and the second gate is positioned to inject plastic into a rib on the rear surface of the back. Plastic may be simultaneously injected through the first gate and through the second gate. The plastic that is injected through the second gate may be a lower quality, or less strong plastic that may contain reground material because this plastic fills the portion of the mold that define the back but not the portions of the mold that define the seat or the legs. Plastic injected through the first gate forms the seat and the legs.

Other features and advantages of our Adirondack chair and our method of making it will become apparent from a description of present preferred embodiment thereof which is shown in the drawings.

DESCRIPTION OF THE PRESENT PREFERRED EMBODIMENTS

Figure 1:
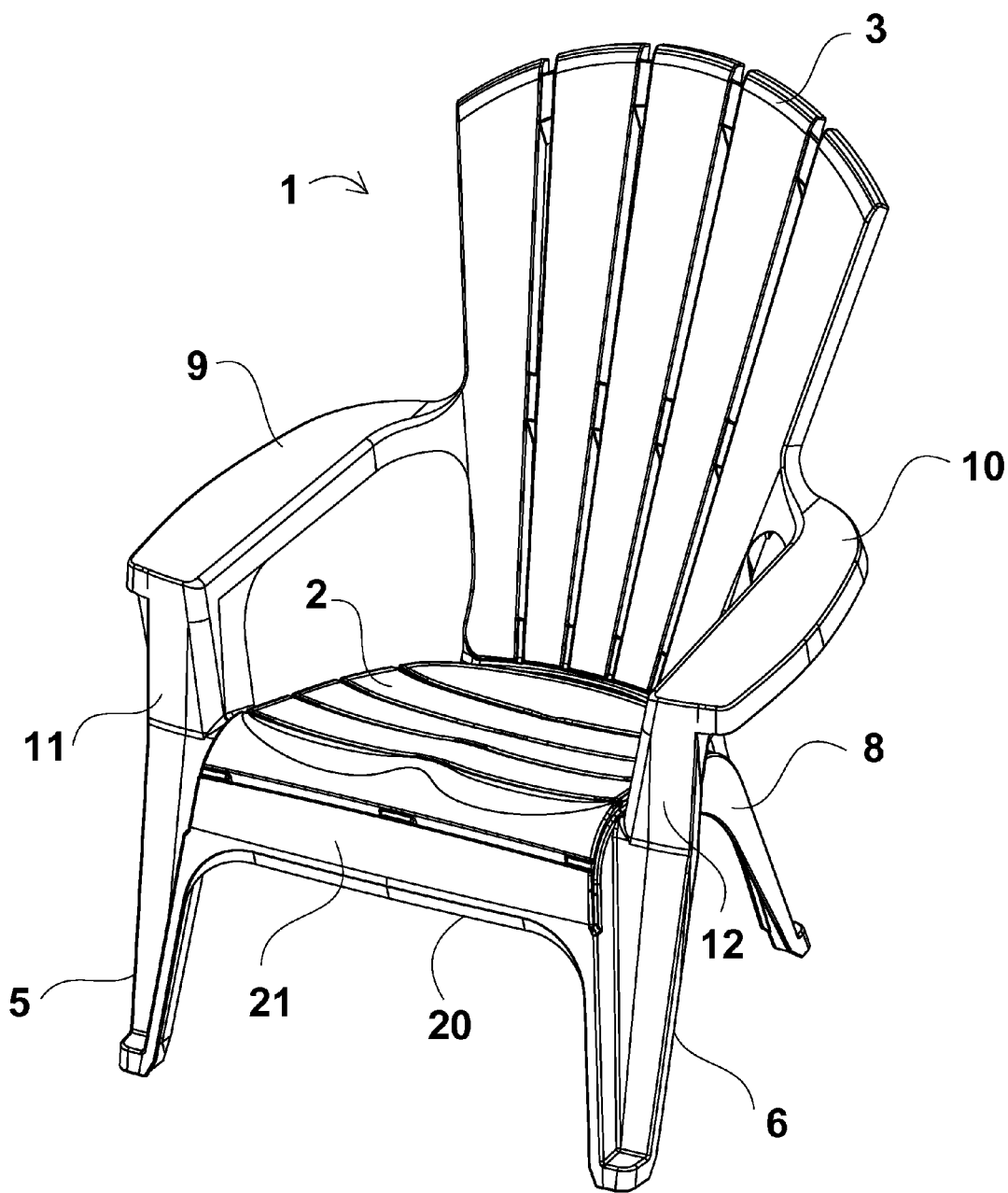
FIG. 1 is a front perspective view of a present preferred embodiment of our lightweight Adirondack chair.
Figure 2:
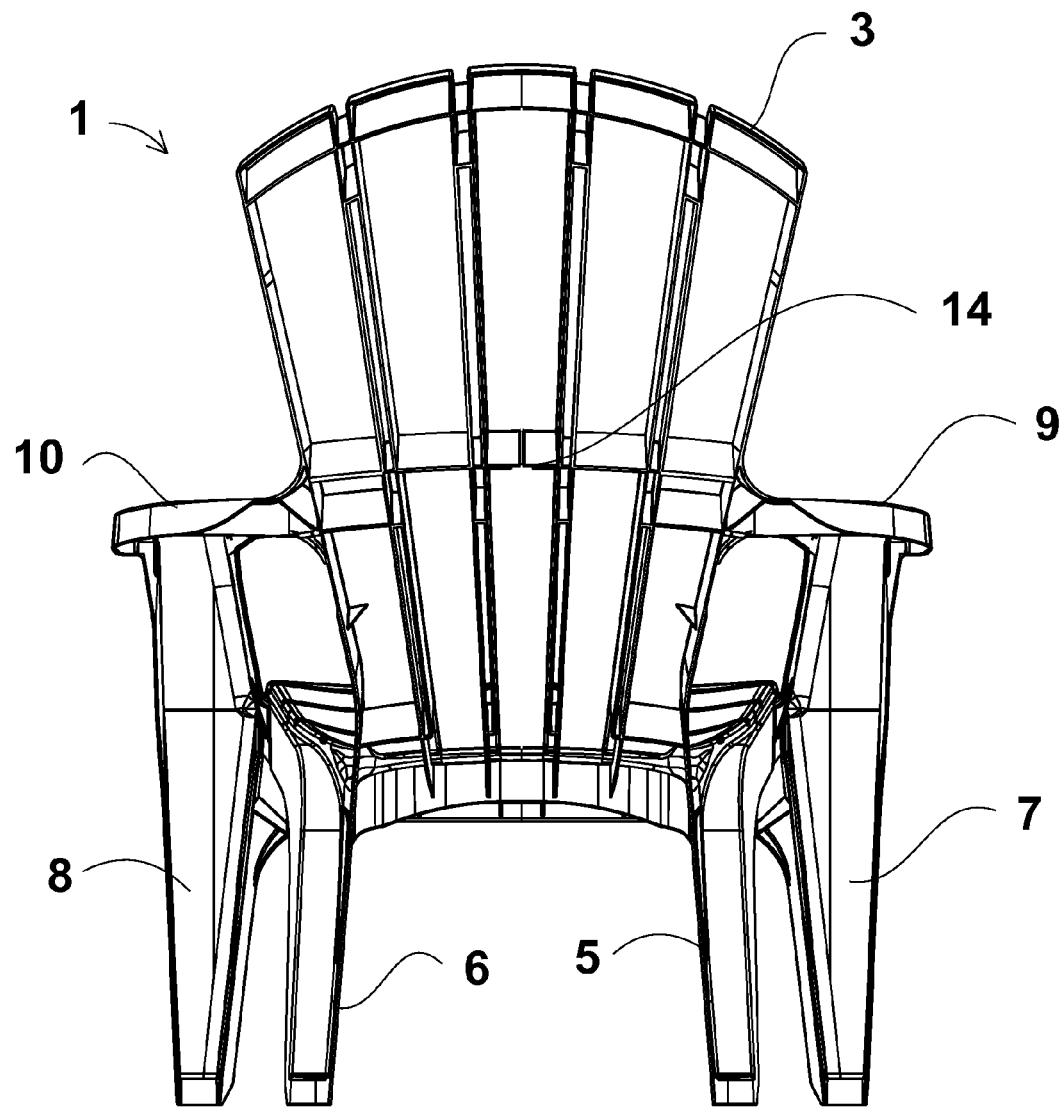
FIG. 2 is a rear view of the embodiment shown in FIG. 1.

Referring to FIGS. 1 and 2, a first present preferred embodiment of our Adirondack chair 1 includes a seat 2 attached to a back 3. The back 3 is more upright relative to the seat 2 in this chair than in conventional Adirondack chairs. In this chair the angle between the seat and the back is about 100°, i.e. between 95° and 105°, while in a conventional Adirondack chair that angle is between 110° and 120°. The rear of the seat is also higher than the rear of the seat in a conventional Adirondack chair. A pair of front legs 5 and 6 extends from the front of the seat 2 and back legs 7 and 8 extend from the rear of the seat 2 and the back 3. One end of arms 9 and 10 are attached to the back 3 of the chair. The opposite end of each arm is attached to an arm support 11, 12, that is connected to a front leg 5, 6 adjacent a front corner of the seat 2. The arms 9 and 10, arm supports 11, 12, back 3, seat 2 and legs 5-8 are integrally molded as a unitary structure. If desired the back and arms could be modified to fold forward. Preferably, the chair 1 is formed by injection molding and is composed of a polymeric material such as polycarbonate, ABS, polypropylene or other plastics.

We prefer to mold the chair using an injection molding process and a single mold that has two gates. One gate injects plastic into the center of a rib 13 under the front of the seat. The second gate injects plastic into the center of a cross rib 14 at the center of the back. Injecting plastic at the cross ribs improves the flow of plastic through the mold. Using a double gate permits faster filling of the mold reducing cycle time. Positioning the gates at these ribs provides balanced filling of the mold cavity so that both gates can be closed at the same time to complete the injection process. Using two gates enables the mold to fill a few seconds faster, reducing cycling time. It took almost 20% less time to mold the chair shown in the drawings compared to the time required to make Adirondack chair disclosed in U.S. Pat. No. 8,333,430 B2. Because the back and arms of the chair are subjected to smaller forces than the seat and legs of the chair a manufacturer could choose to use a lower quality and less expensive polymer or polymer blend for the back and arms than are used for the seat and legs. For example, reground material could be used in the back and arms, but not used in the seat and legs. Providing one gate at the seat which fills the seat and legs and a second gate at the back which fills the back and arms permits the use of a different material for the back and arms than is used for the seat and legs.

Figure 5:
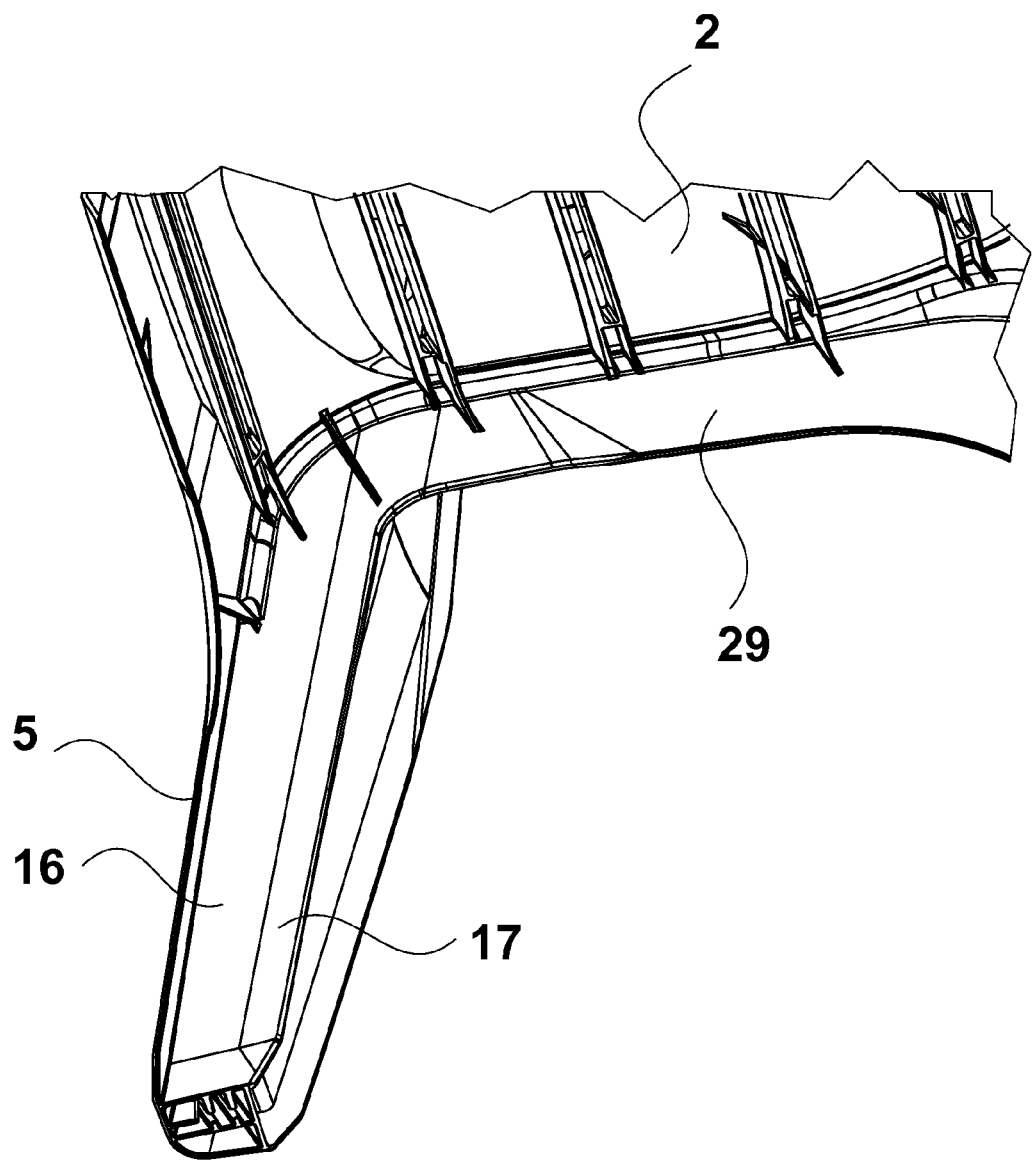
FIG. 5 is a perspective fragmentary view of the inside of the front leg of the embodiment shown in FIG. 1.

To reduce the weight of the chair the maximum wall thickness in nearly every portion of the chair is 0.150" thick. A few ribs have a thickness of between 0.150" and 0.175" to provide greater support. The thinner walls allow faster cooling of the mold during the manufacturing process. The seat side wall is preferably formed between the core and cavity as opposed to being a buried rib in the core side of the mold. The seat side wall angles outward slightly which allows for tighter stacking. Referring to FIG. 5, the forward portion 16 of the front leg 5, 6 is formed between the core and cavity with the rear portion 17 having a rib buried in the core.

Figure 6:
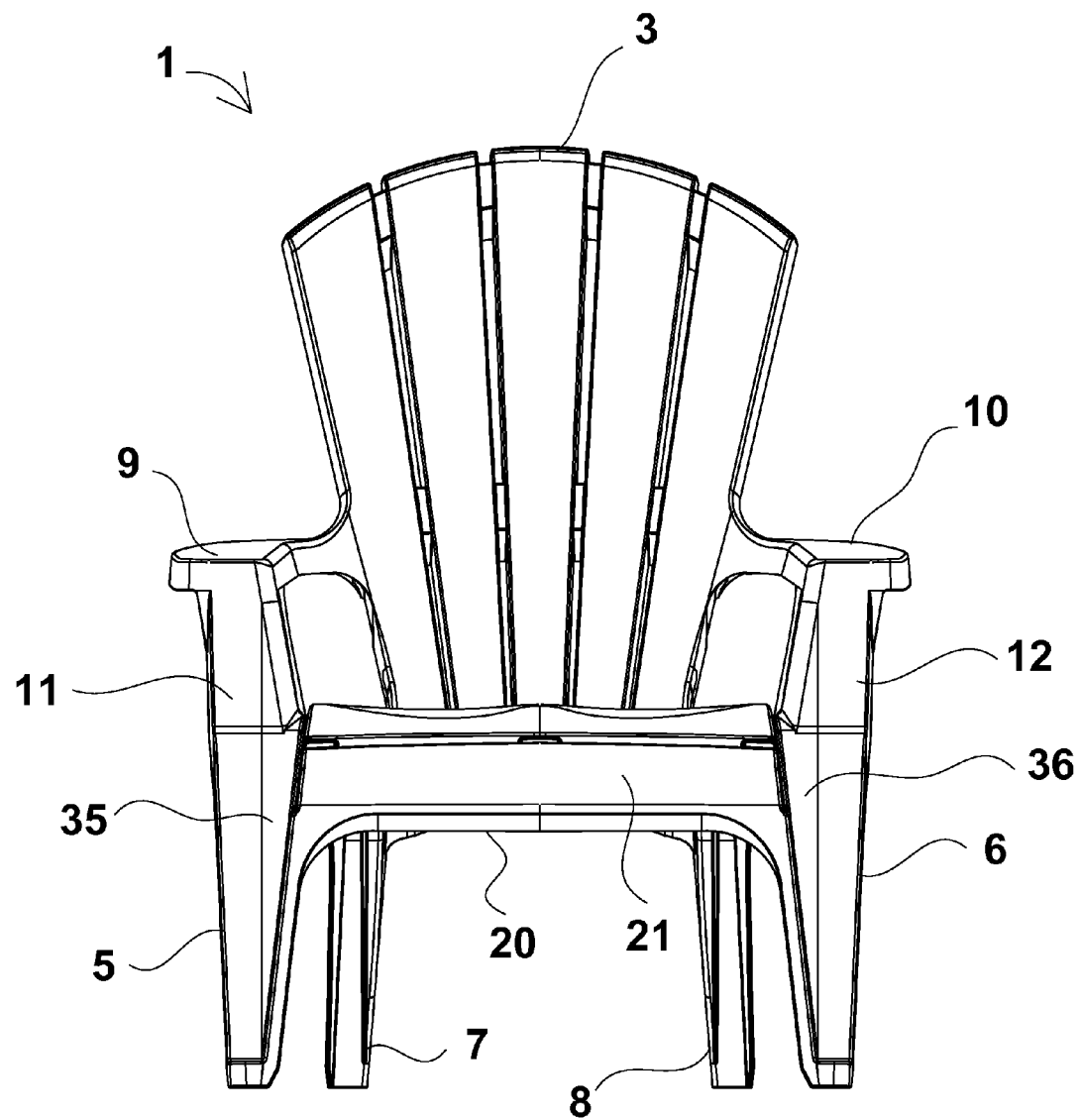
FIG. 6 is a front view of the Adirondack chair shown in FIG. 1.
Figure 7:
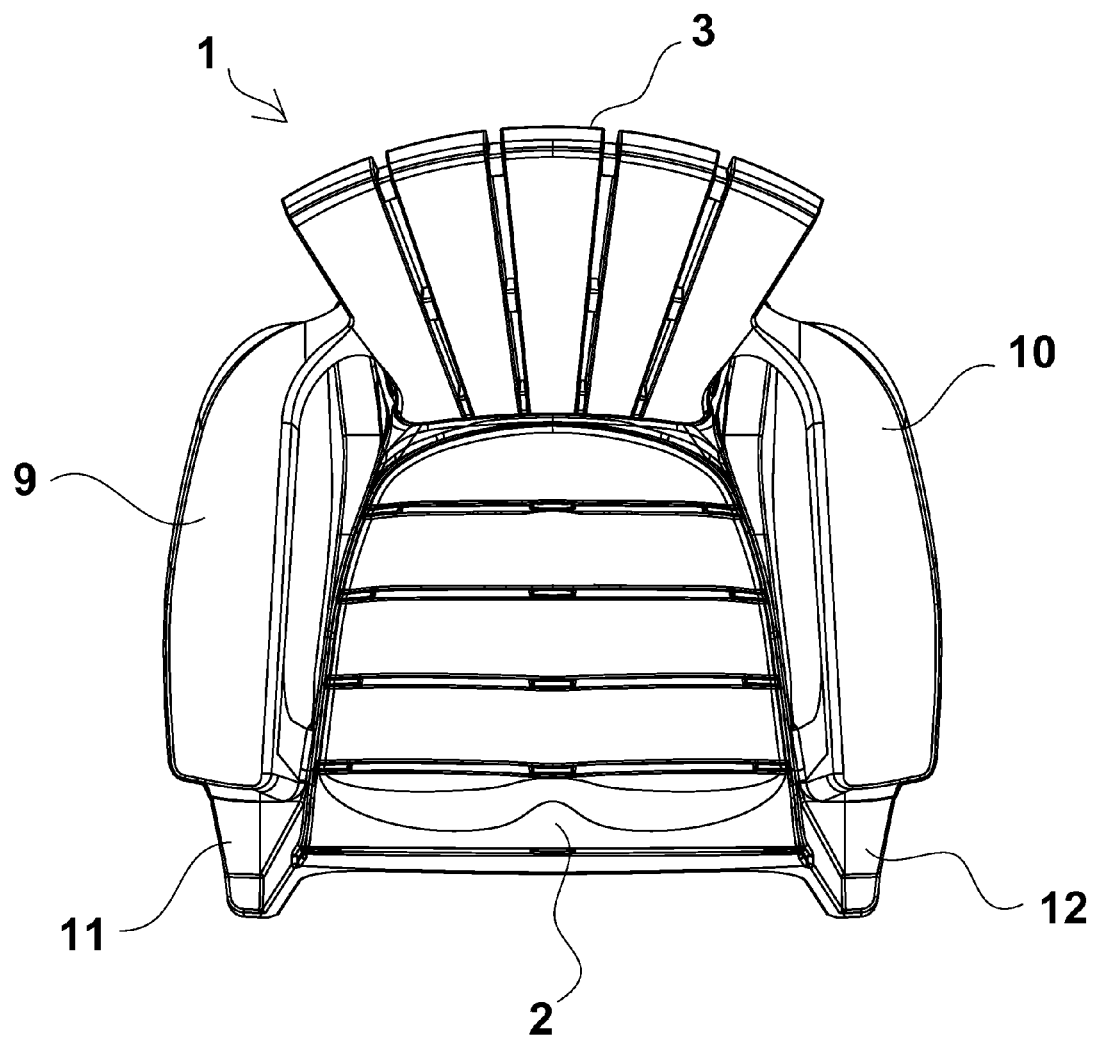
FIG. 7 is a top plan view of the Adirondack chair shown in FIG. 1.

As can be most clearly seen in FIGS. 1 and 6 the lower ¾" edge 20 of the front slat 21 angles rearward to provide a structural reinforcement to the slat and to resist bowing/buckling of the slat. The arch shape of the lower edge of this front slat with the front legs also provides structural support. The seat 2 is wider at the front than at the back and the rear of the seat has large radiuses in the corners. See FIG. 7. Making the rear edge of the seat narrower provides a shorter span between the back legs than the front legs and improves the strength of the chair. This is important because it helps the chair pass the drop test described above.

Figure 3:
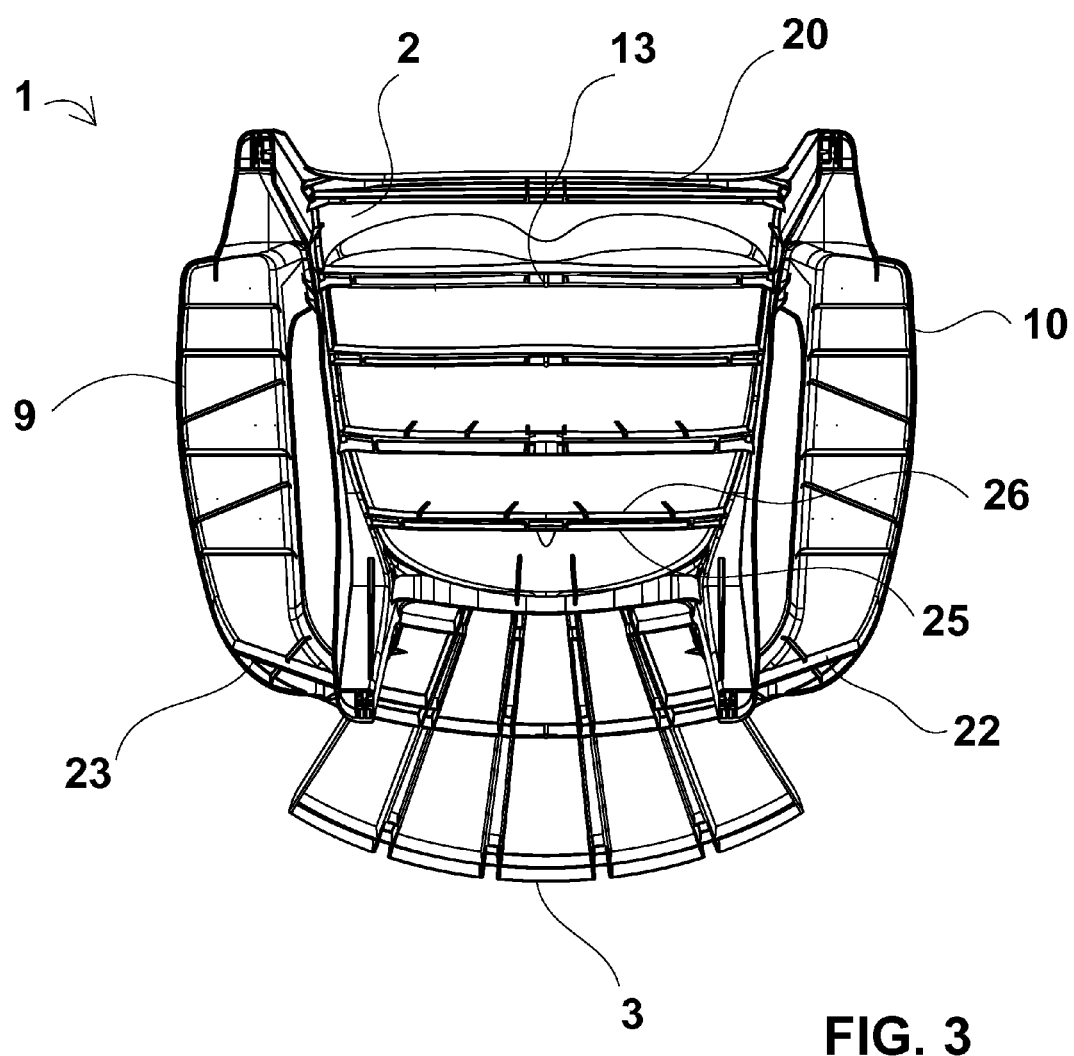
FIG. 3 is a bottom view of the embodiment shown in FIG. 1
Figure 4:
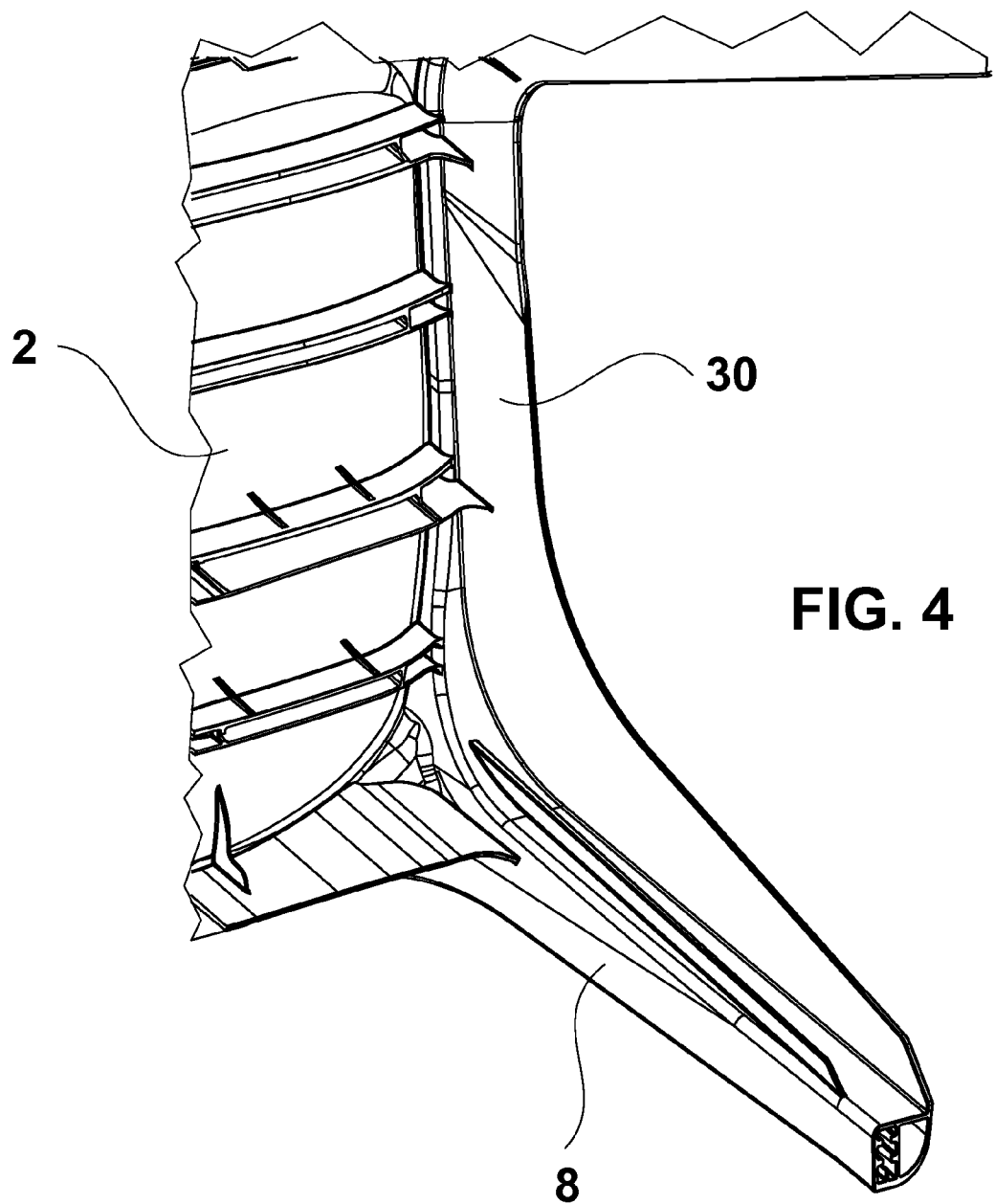
FIG. 4 is a perspective fragmentary view of the inside of the rear leg of the embodiment shown in FIG. 1.
Figure 8:
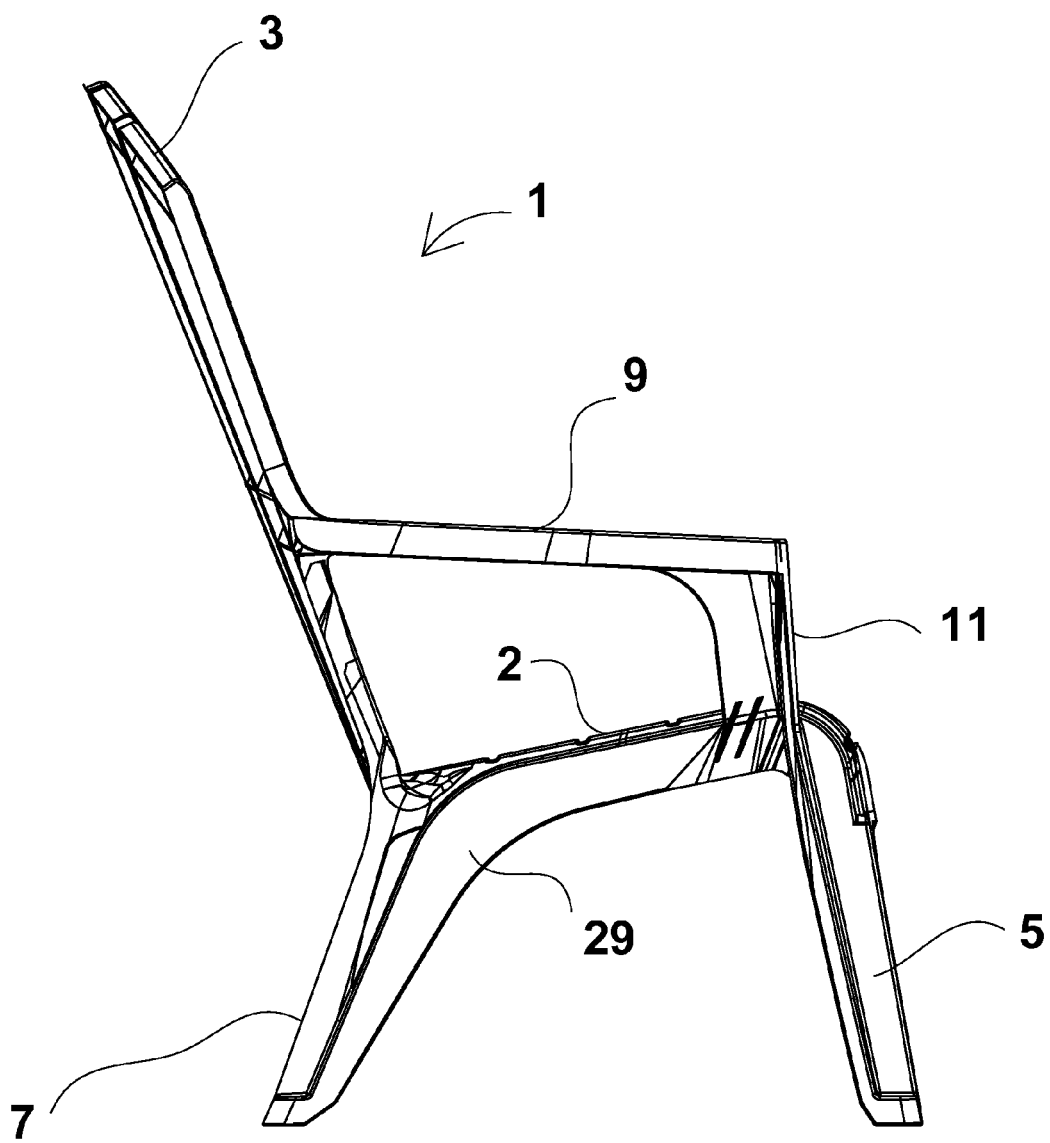
FIG. 8 is a right side view of the Adirondack chair shown in FIG. 1.
Figure 10:
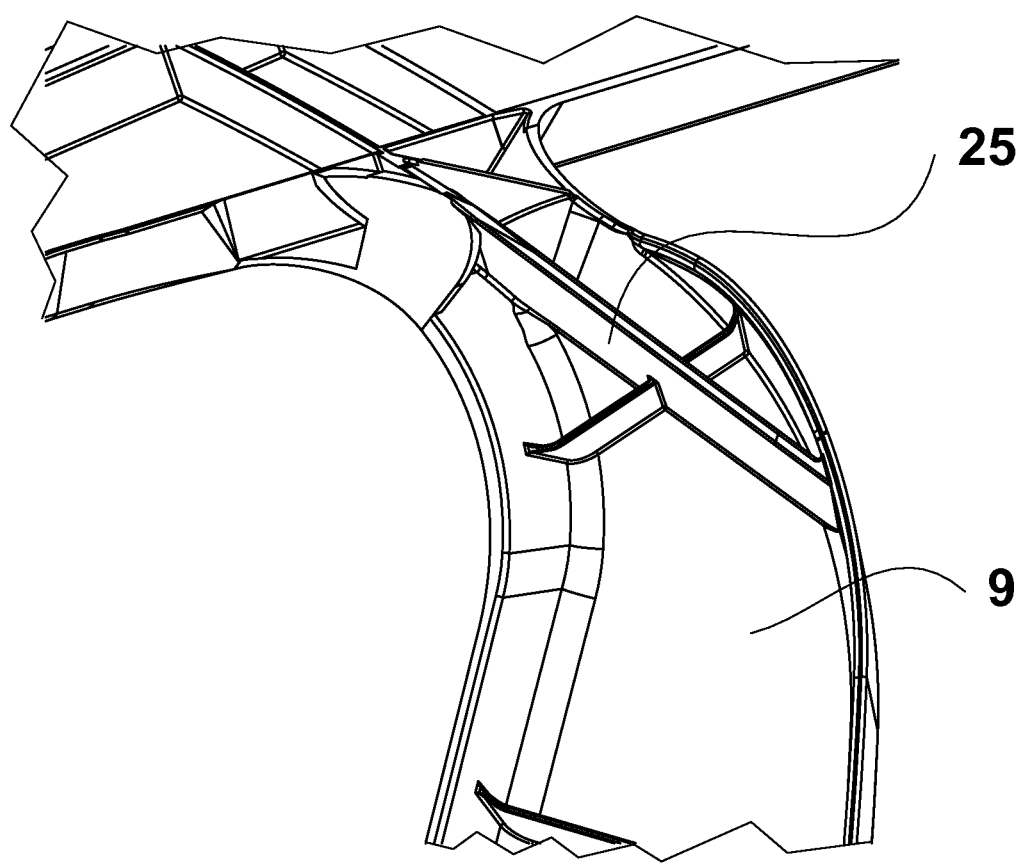
FIG. 10 is a perspective view of the underside of a portion of the left arm where the arm is connected to the back.
Figure 11:
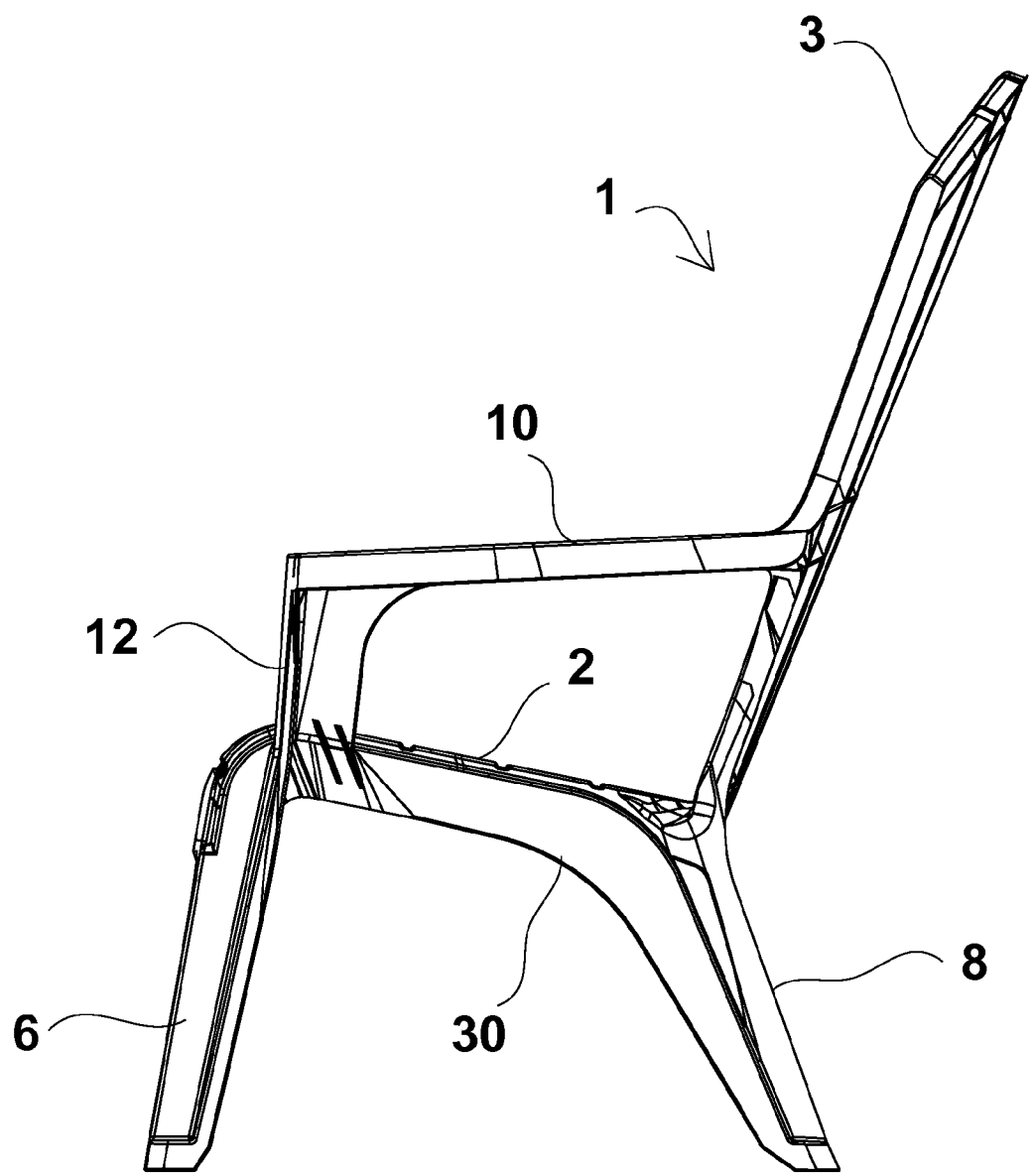
FIG. 11 is a left side view of the Adirondack chair shown in FIG. 1.

Each arm support 11, 12 angles forward to allow the arm to be longer, as can be seen in FIGS. 8 and 11. Referring to FIGS. 3 and 10 a tall thick rib 22, 23 at the intersection of the arm and the back provides arm support.

Figure 9:
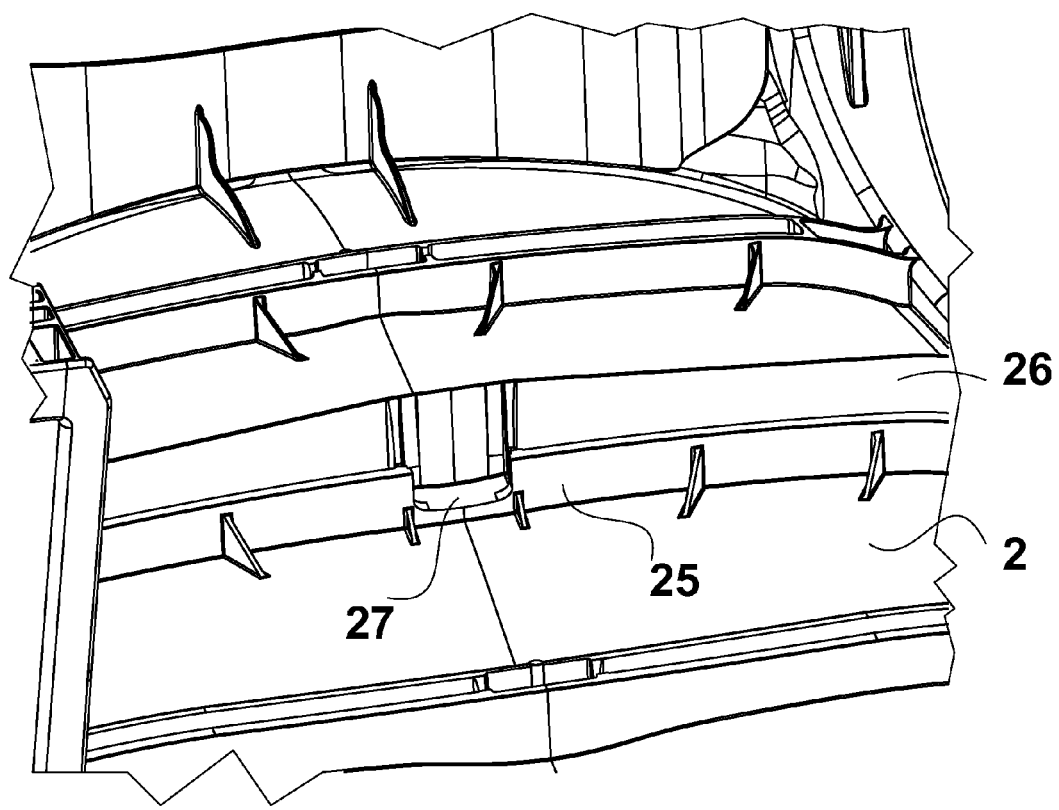
FIG. 9 is a perspective fragmentary view of a portion of the bottom of the seat near the main tail rib.

Two structures in the underside of the seat which can be seen in FIGS. 3 and 9 enable the seat to flex when a weight is placed on or dropped on the seat. There is a small rib 25 adjacent to main tall rib 26 under the seat which is notched to provide flex. This notch 27 can be most clearly seen in FIG. 9. In a conventional wooden Adirondack chair and in molded plastic Adirondack chairs the inside edge or inside wall of each front leg is vertical or near vertical. This can be seen for example in U.S. Pat. Nos. 7,401,854 and 8,333,430 B2. However in the present Adirondack chair the inside walls 35, 36 of the front legs 5,6 extend inward from the front edge of the side wall to the back edge of the side wall as can be seen most clearly in FIG. 6. This inward slope or curvature provides spring in the side wall resulting in better performance of the chair in the drop test.

There is a side wall 29, 30 that extends from each side of the seat 2 and runs from the bottom of the front leg 5, 6 across the side of the seat 2 to the bottom of the back leg 7, 8. Each side wall is not in a vertical plane, but rather slopes outward. This kick-out of the side walls allows tighter nesting. The side walls 29, 30 vary in height along their length. The height of each side wall 29, 30 is greatest at the transition from the seat 2 to the back leg 7, 8 as can clearly be seen in FIGS. 8 and 11. This structural feature improves the strength of the chair.

The Adirondack chair here described has several structural features that have previously not been used in Adirondack chairs, and particularly molded plastic Adirondack chairs. These features are: (i) the seat being narrower at the back than at the front, (ii) a side wall varying in height that extends from each side edge of the seat, a front leg and a back leg and is tallest at the transition between the seat and the back leg, (iii) a front slat that extends from the front edge of the seat and between the front legs forming an arch with the front legs, (iv) the front slat having a lower edge portion that slopes inwardly, (v) a rib on the underside of the seat adjacent and adjacent side which is smaller in height and has a notch near its center and (vi) the front legs each having an inner side wall that slopes inward from the front edge of the side wall to the back edge of the side wall. Each of the structural features described above can be separately added to a molded plastic Adirondack chair to improve the strength of the chair. Improving the strength using these features may then allow the thickness of many portions of the chair to be reduced thereby making the chair weigh less. We have found that the combination of these structural features provided sufficient strength in a lightweight Adirondack chair, so that the chair will pass the ASTM static load test and the drop test described above. Indeed, we tested an Adirondack chair as shown in the drawings which was made from a blend of 90% polypropylene and 10% polypropylene containing a small amount of polyethylene to provide impact resistance which weighed only around 6 pounds. This chair passed both the ASTM static load test and the drop test described above. We produced another chair made from 100% a polypropylene which also weighed around 6 pounds and also passed both of these tests. Because polyethylene is more expensive being able to make this chair of 100% polypropylene can provide significant savings for the manufacturer.

Thirty of the present chairs can be stacked on a pallet that is the same height as a pallet containing 24 of the Adirondack chairs disclosed in U.S. Pat. No. 8,333,430 B2. Because a more upright back creates a smaller front-to-back dimension on the pallet, we now get 1800 chairs per truckload compared to 1368 chairs per truckload of the Adirondack chairs disclosed in the '430 patent. The 52 foot long trailer carries 60 pallets (3 columns of 20 pallets) of the present Adirondack chair instead of 57 (3 of 19) of the '430 chair.

While we have disclosed certain present preferred embodiments of our lightweight Adirondack chair, it should be distinctly understood that our invention is not limited therefore but may be variously embodied within the scope of the following claims.

We claim:

1. A chair composed of a polymeric material comprising:
   a seat having a front edge, a back edge, the back edge being narrower than the front edge, a first side edge and a second side edge;
   a back attached to the seat;
   a left front leg and a right front leg, each leg attached to the seat adjacent to the front edge of the seat;
   a left back leg and a right back leg, each leg attached to the seat adjacent the rear edge of the seat;
   a left side wall extending along at least a portion of the left front leg, along the first side edge of the seat and along at least a portion of the left rear leg;
   a right side wall extending along at least a portion of the right front leg;
   a left arm extending from the back toward the front edge of the seat;
   a left arm support having one end attached to the left arm and an opposite end attached to the left front leg;
   a right arm extending from the back toward the front edge of the seat;
   a right arm support having one end attached to the right arm and an opposite end attached to the right front leg; and
   a first rib on the underside of the seat and having a first height and a second rib adjacent the first rib, the second rib having a height that is less than the first height and having a notch near its center.

2. The chair of claim 1 also comprising a front slat that extends from the front edge of the seat and between the front legs, the front slat and the front legs forming an arch.

3. The chair of claim 2 wherein the front slat has a lower edge portion that slopes inwardly.

4. The chair of claim 1 wherein the front legs each have an inner side wall that slopes inward from a front edge of the side wall to a back edge of the side wall.

5. The chair of claim 1 wherein the back and the seat meet at an angle of between 95° and 105°.

6. The chair of claim 1 wherein the chair weighs not more than 6 pounds.

7. The chair of claim 1 wherein the chair weighs about 6 pounds.

8. The chair of claim 1 wherein the left side wall and the right side wall extend outward.

9. A chair composed of a polymeric material comprising:
   a seat having a front edge, a back edge, the back edge being narrower than the front edge, a first side edge and a second side edge;
   a back attached to the seat;
   a left front leg and a right front leg, each leg attached to the seat adjacent to the front edge of the seat;
   a left back leg and a right back leg, each leg attached to the seat adjacent the rear edge of the seat;
   a left side wall extending along at least a portion of the left front leg, along the first side edge of the seat and along at least a portion of the left rear leg;
   a right side wall extending along at least a portion of the right front leg;
   a left arm extending from the back toward the front edge of the seat;
   a left arm support having one end attached to the left arm and an opposite end attached to the left front leg;
   a right arm extending from the back toward the front edge of the seat; and
   a right arm support having one end attached to the right arm and an opposite end attached to the right front leg;
   wherein the seat and legs are a first polymeric material and the back and arms are a second polymeric material.

10. The chair of claim 9 wherein reground plastic was used to make the second polymeric material.

11. An chair composed of a polymeric material comprising:
    a seat having a front edge, a back edge, the back edge being narrower than the front edge, a first side edge and a second side edge;
    a back attached to the seat;
    a left front leg and a right front leg, each leg attached to the seat adjacent to the front edge of the seat, the front legs each having an inner side wall that slopes inward from a front edge of the side wall to a back edge of the side wall;
    a left back leg and a right back leg, each leg attached to the seat adjacent the rear edge of the seat;
    a left side wall extending along at least a portion of the left front leg, along the first side edge of the seat and along at least a portion of the left rear leg, the left side wall varying in height along its length and being tallest adjacent a transition from the first side edge of the seat to the left rear leg;
    a right side wall extending along at least a portion of the right front leg, along the second side edge of the seat and along at least a portion of the right rear leg, the right side wall varying in height along its length and being tallest adjacent a transition from the second side edge of the seat to the right rear leg;
    a left arm extending from the back toward the front edge of the seat;
    a left arm support having one end attached to the left arm and an opposite end attached to the left front leg, the left arm support extending forward relative to the seat;
    a right arm extending from the back toward the front edge of the seat;
    a right arm support having one end attached to the right arm and an opposite end attached to the right front leg, the right arm support extending forward relative to the seat;

a front slat that extends from the front edge of the seat and between the front legs, the front slat and the front legs forming an arch; and a first rib on the underside of the seat and having a first height and a second rib adjacent the first rib, the second rib having a height that is less than the first height and having a notch near its center.

12. The chair of claim 11 wherein the front slat has a lower edge portion that slopes inwardly.

* * * * *